(12) United States Patent
Ohana

(10) Patent No.: US 10,819,090 B2
(45) Date of Patent: Oct. 27, 2020

(54) DRAW WIRE APPARATUS

(71) Applicant: Avraham Ohana, Jerusalem (IL)

(72) Inventor: Avraham Ohana, Jerusalem (IL)

( * ) Notice: Subject to any disclaimer, the term of this patent is extended or adjusted under 35 U.S.C. 154(b) by 99 days.

(21) Appl. No.: 16/231,635

(22) Filed: Dec. 24, 2018

(65) Prior Publication Data
US 2019/0199073 A1    Jun. 27, 2019

Related U.S. Application Data

(60) Provisional application No. 62/610,293, filed on Dec. 26, 2017.

(51) Int. Cl.
*H02G 1/08* (2006.01)
*B25F 5/00* (2006.01)
*F16N 7/14* (2006.01)

(52) U.S. Cl.
CPC ............... *H02G 1/085* (2013.01); *B25F 5/00* (2013.01); *F16N 7/14* (2013.01); *H02G 1/083* (2013.01); *H02G 1/088* (2013.01); *F16N 2210/34* (2013.01)

(58) Field of Classification Search
CPC ........... H02G 1/083; H02G 1/088; F16N 7/14
See application file for complete search history.

(56) References Cited

U.S. PATENT DOCUMENTS

| 71,952,320 | * | 3/2007 | Fast-Karberg | ....... G02B 6/4463 226/91 |
| 2008/0240877 | A1* | 10/2008 | Kirby | ................. B23Q 11/0046 408/58 |
| 2009/0214307 | A1* | 8/2009 | Nguyen | ................. B23Q 11/10 408/56 |
| 2019/0199073 | A1* | 6/2019 | Ohana | .................... H02G 1/083 |

* cited by examiner

*Primary Examiner* — Lee D Wilson
(74) *Attorney, Agent, or Firm* — Alphapatent Associates, Ltd.; Daniel J. Swirsky

(57) ABSTRACT

A draw wire apparatus, including: a rod and a motor for rotating the rod; a thread extending from the rod, for being attached to a draw wire, and shaped for advancing thereof upon the rotation of the rod; and an oil pump characterized in being operated by the rotation of the rod, and disposed adjacent to the draw wire, thereby drawing oil onto, thereby the motor lubricates the draw wire and as well advances thereof.

3 Claims, 2 Drawing Sheets

DRAW WIRE APPARATUS

CROSS-REFERENCE TO RELATED APPLICATIONS

This application claims the benefit of priority from U.S. Provisional Patent Application No. 62/610,293, filed Dec. 26, 2017, the disclosure of which is incorporated herein by reference.

TECHNICAL FIELD

The invention relates to the field of draw wires. More particularly, the invention relates to an apparatus for inserting it into a wall channel.

BACKGROUND

Inserting a draw wire must be accompanied with lubrication thereof.

There is a long felt need to provide an apparatus for applying both operations concurrently.

SUMMARY

In accordance with an embodiment of the invention, a draw wire apparatus is provided, including a rod and a motor, a thread extending from the rod, and an oil pump operated by the rotation of the rod.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figures 1, 2:
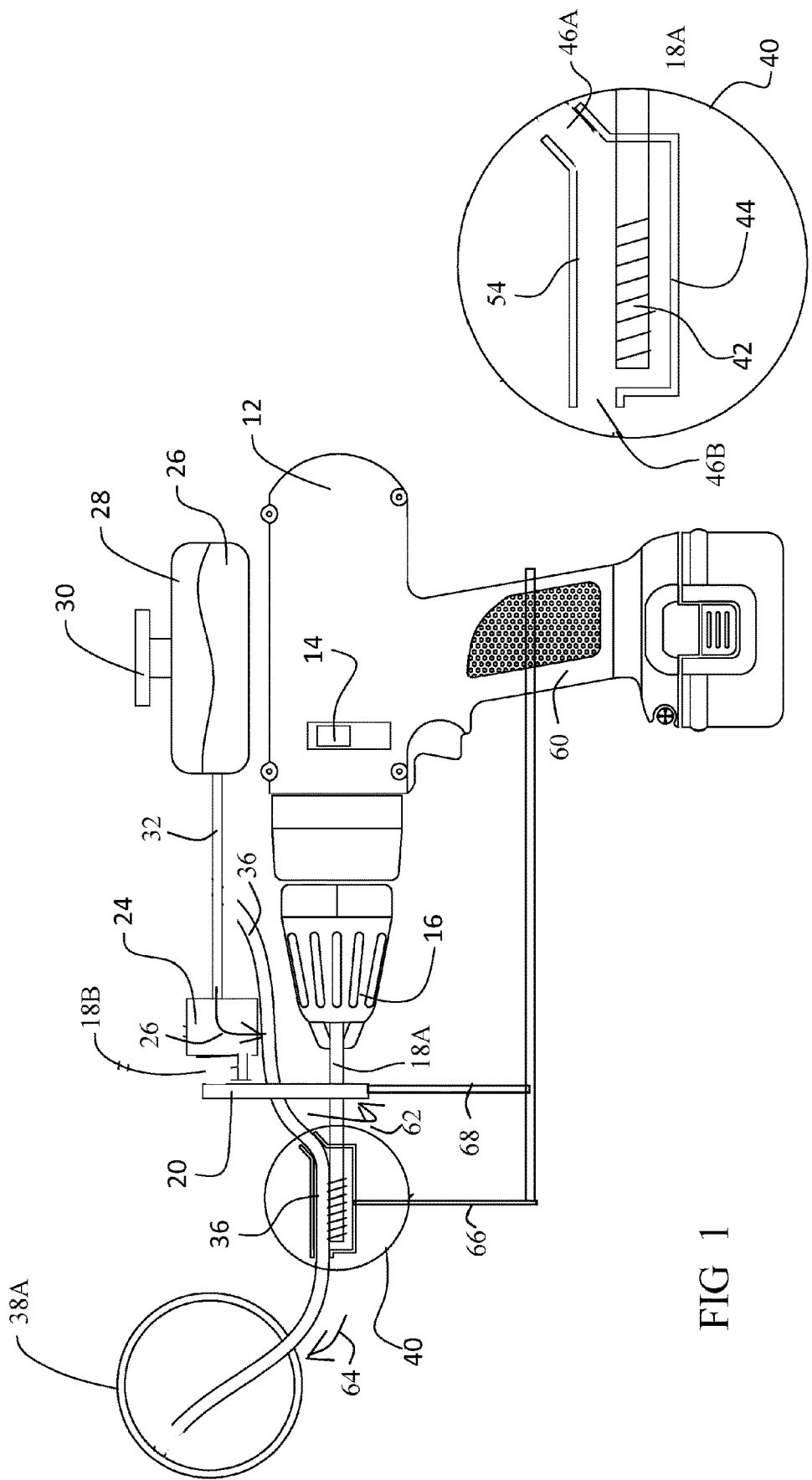
FIG. 1 depicts a draw wire apparatus according to one embodiment of the invention.
FIG. 2 magnifies the end of the rod of FIG. 1.

FIG. 1 depicts a draw wire apparatus according to one embodiment of the invention.

The term "draw wire" refers herein to a tool constituting a wire used by electricians to route new wiring through conduits in the wall.

The term "screw gun" refers herein to a motorized accessory for rotating a screw or any other rod.

At the first step, a screw gun 12 rotates a rod 18A within a cartridge 44, being fixed by fixing 68 to the body 60 of screw gun 12.

FIG. 2 magnifies the end of the rod of FIG. 1.

Cartridge 44 has openings 46A and 46B.

Rod 18A ends with a rotatable thread 42 disposed within cartridge 44.

Referring again to FIG. 1, rotation of rod 18A by screw gun 12 rotates thread 42, being attached to draw wire 36, thereby advancing it.

Thus, the draw wire 36 advances 64 in relation to cartridge 44 through openings 46A and 46B of cartridge 44.

Referring yet to FIG. 1, the rotation 62 of rod 18A further rotates an axle 18B of an oil pump 24 through a transmission 20, thus as well draws oil 26 from oil tank 28, through a pipe 32 and a pump 24, onto draw wire 36. The body of transmission 20 is fixed to screw gun 12.

Figure 3:
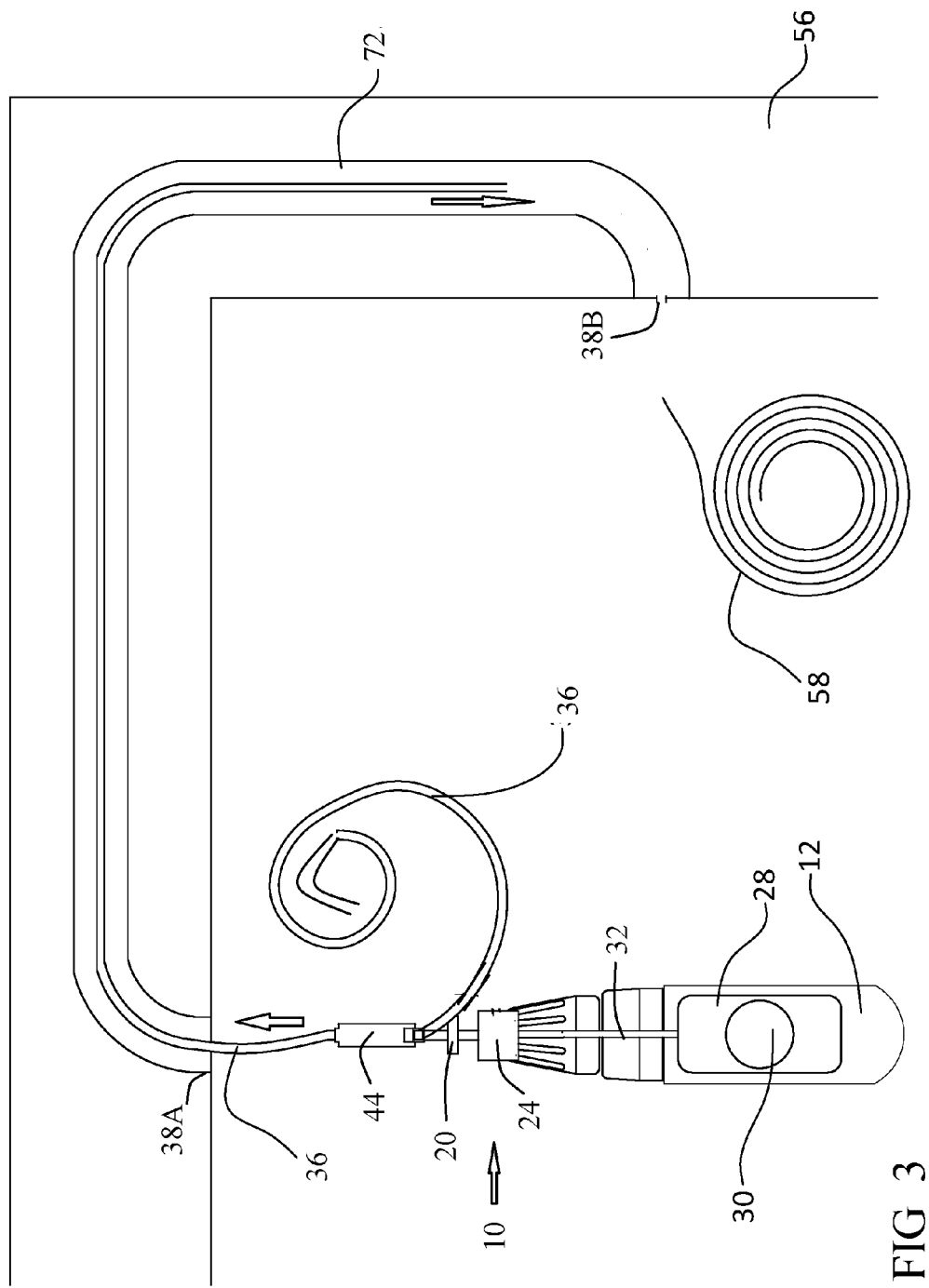
FIG. 3 is a top view of the draw wire apparatus of FIG. 1 at work.

FIG. 3 is a top view of the draw wire apparatus of FIG. 1 at work.

Draw wire apparatus 10 lubricates draw wire 44 and then advances it into entrance 38A of wall channel 72. Upon exit of draw wire 44 to exit 38B of wall channel 72, the worker may tie the end of draw wire 44 to an electric cable 58.

Thus, in one aspect, the invention is directed to a draw wire apparatus (10), including:
- a rod (18A) and a motor (12) for rotating the rod (18A);
- a thread (42) extending from the rod (18A), for being attached to a draw wire (36), and shaped for advancing (64) thereof upon the rotation of the rod (18A); and
- an oil pump (24) characterized in being operated by the rotation of the rod (18A), and disposed adjacent to the draw wire (36), thereby drawing oil (26) onto, thereby the motor (12) lubricates the draw wire (36) and as well advances (64) thereof.

The draw wire apparatus may further include:
- a transmission (20) for interlacing the rod (18A) with an axle (18B) of the oil pump (24), thereby the oil pump (24) is characterized in being operated by the rotation of the rod (18A).

The draw wire apparatus may further include:
- a cartridge (44), for housing the thread (42), the cartridge (44) being fixed (66) to the motor (12), and including two openings (46A, 46B), thereby advancing the draw wire (36) in relation to the cartridge (44) through the openings (46A, 46B).

The motor (12) may constitute a screw gun.

In another aspect, the invention is directed to a draw wire apparatus (10) not including the motor, but rather including:
- a thread (42) extending from a rod (18A), for being attached to a draw wire (36), and shaped for advancing (64) thereof upon rotation of the rod (18A); and
- an oil pump (24) characterized in being operated by the rotation of the rod (18A), and disposed adjacent to the draw wire (36), thereby drawing oil (26) onto, thereby the draw wire apparatus (10) is characterized for inserting the rod (18A) into a screw gun (12), for lubricating the draw wire (36) and advancing (64) thereof.

In the figures and/or description herein, the following reference numerals (Reference Signs List) have been mentioned:
- numeral 10 denotes the draw wire apparatus according to one embodiment of the invention;
- numeral 12 denotes a motor, which may constitute a screw gun;
- numeral 14 denotes a switch of screw gun 12;
- numeral 16 denotes a screw fastener of screw gun 12;
- numeral 18A denotes the rod, being directly rotated by screw gun 12;

numeral 20 denotes a transmission for interlacing rod 18A to axle 18B, by a band or by interlaced cogs (not shown);

numeral 24 denotes an oil pump;

numeral 26 denotes oil;

numeral 28 denotes an oil tank;

numeral 30 denotes a cap for filling tank 28 with oil, for lubricating draw wire 36;

numeral 32 denotes an oil pipe;

numeral 36 denotes the draw wire;

numerals 38A and 38B denote entrance and exit respectively of wall channel 72;

numeral 40 denotes a zone;

numeral 44 denotes the cartridge;

numeral 54 denotes the cartridge cover, which may be removed for inserting draw wire 36 into cartridge 44, and then be pressed on draw wire 36, for pressing draw wire 36 on thread 42 of rod 18A;

numeral 56 denotes the wall;

numeral 58 denotes the electric cable;

numeral 60 denotes body of screw gun 12;

numeral 62 denotes rotation of rod 18A;

numeral 64 denotes advance of draw wire 36;

numeral 66 denotes fixing of cartridge 44 to body 60 of screw gun 12;

numeral 68 denotes fixing of transmission 20 to body 60 of screw gun 12; and numeral 72 denotes the channel in wall 70;

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A draw wire apparatus, comprising:

a rod and a motor for rotating said rod;

a thread extending from said rod, for being attached to a draw wire, and shaped for advancing thereof upon said rotation of said rod;

an oil pump being operated by said rotation of said rod, and disposed adjacent to said draw wire, thereby drawing oil onto; and a cartridge, for housing said thread, said cartridge being fixed to said motor, and comprising two openings, thereby advancing said draw wire in relation to said cartridge through said openings, thereby said motor lubricates said draw wire and as well advances thereof.

2. The draw wire apparatus of claim 1, further comprising:

a transmission for interlacing said rod with an axle of said oil pump, thereby said oil pump is operated by said rotation of said rod.

3. The draw wire apparatus of claim 1, wherein said motor comprises a screw gun.

* * * * *